United States Patent [19]

Hart et al.

[11] Patent Number: 5,451,099

[45] Date of Patent: Sep. 19, 1995

[54] RAILWAY BRAKE PIPE BRACKET ACCESS PLATE

[75] Inventors: James E. Hart, Trafford; Gary M. Sich, Irwin, both of Pa.

[73] Assignee: Westinghouse Air Brake Company, Wilmerding, Pa.

[21] Appl. No.: 365,531

[22] Filed: Dec. 28, 1994

[51] Int. Cl.⁶ .............................................. B60T 15/22
[52] U.S. Cl. ........................................ 303/33; 303/37; 303/86; 303/28; 285/63
[58] Field of Search .................. 303/33, 28, 36, 38, 303/82, 86, 81, 35, 37, 39, 74, 69; 285/137.1, 63, 161, 158; 137/347, 349

[56] References Cited

U.S. PATENT DOCUMENTS

| | | | |
|---|---|---|---|
| 1,309,787 | 7/1919 | Turner | 303/82 |
| 2,087,623 | 7/1937 | Canetta et al. | 303/42 |
| 2,464,977 | 3/1949 | Gorman | 303/26 |
| 2,802,701 | 8/1957 | McClure | 303/39 |
| 3,022,117 | 2/1962 | Hewitt | 303/39 |
| 3,160,446 | 12/1964 | McClure et al. | 303/36 |
| 3,716,276 | 2/1973 | Wilson et al. | 303/82 |
| 3,734,575 | 5/1973 | Paginton | 303/33 |
| 3,944,264 | 3/1976 | Mong et al. | 285/137.1 |
| 4,033,632 | 7/1977 | Wilson | 303/74 |
| 4,188,071 | 2/1980 | Hart | 303/33 |
| 4,770,472 | 9/1988 | Weber, Jr. et al. | 303/33 |
| 4,830,438 | 5/1989 | Hart et al. | 303/38 |

OTHER PUBLICATIONS

AB Single Capacity Freight Car Air Brake Equipment with ABDX Type Control Valve Catalog by Westinghouse Air Brake Company, 1991.

"Code of Air Brake System Tests for Freight Equipment" Association of American Railroads, Nov., 1992.

Primary Examiner—Douglas C. Butler
Attorney, Agent, or Firm—Gary J. Falce

[57] ABSTRACT

An access plate mounted between the pipe bracket portion and either the service portion or the emergency portion of a railway freight brake control valve. Passageways are provided through the access plate, each passageway terminating in a respective access port along an end of the access plate. Openings extend through opposed sides of the access plate, intersecting respective access plate passageways. The openings on each side are sized and positioned to sealingly align with openings of the pipe bracket portion and either the emergency portion or the service portion. The openings on the pipe bracket portion, emergency portion and service portion connect to passageways communicating to the brake pipe, the brake cylinder retaining valve, the brake cylinder, the emergency reservoir and the auxiliary reservoir. A housing may be attached to the pipe bracket portion to connect to the access ports, such housing preferably having a valve means for preventing the escape of fluid pressure therefrom. An adaptor may engage with the housing, opening the valve means and allowing the fluid under pressure to enter the adaptor. A removable outer cover may be provided over the access housing once the adaptor is removed for providing additional sealing of the fluid under pressure.

21 Claims, 15 Drawing Sheets

RAILWAY BRAKE PIPE BRACKET ACCESS PLATE

BACKGROUND OF THE INVENTION

1. Field of the Invention

This invention relates generally to brake control valve devices for railway cars and more particularly to means adapted to the pipe bracket portion of said brake control valve devices for directly accessing fluid lines and determining the pressures thereof.

2. Description of the Prior Art

Typical freight control valves such as the ABD, ABDW, DB-60 and ABDX control valves, are comprised of a type AB pipe bracket portion having a service portion and an emergency portion mounted on opposite sides or faces of the pipe bracket. Such a typical control valve assembly is shown in prior art diagrammatic FIG. 1. Typically, a third side, the rear, of the pipe bracket portion has a number of connections for connecting the pipe bracket portion to piping of the freight car. These connections typically include connections to the brake pipe, the brake cylinder retaining valve, the brake cylinder, the emergency reservoir and the auxiliary reservoir. The pipe bracket connection to these pneumatic pipes permits the pipe bracket to provide the necessary communication of pressures to both the service and emergency valve portions. The pipe bracket portion, because it has a service portion and an emergency portion mounted on opposed sides, may physically limit access to portions of the car including the various connections. With the pipe bracket portion thus limiting access to the connections, tapping into or otherwise measuring the pressure in the fluid lines is difficult. Thus, one attempting to access the area behind the pipe bracket portion would have to additionally go around the service portion or the emergency portion. In addition, the removal of a service or emergency portion bolted to the sides of the pipe bracket in order to conduct fluid pressure testing is a difficult and time consuming process. Copending Westinghouse Air Brake Company application Ser. No. 08/306,790 is herein incorporated by reference.

SUMMARY OF THE INVENTION

It is an object of the invention to provide a means to directly access the various passageways of the pipe bracket portion without disconnecting any air lines connected to the pipe bracket, without removing either the service portion or the emergency portion, and without having to access the area behind the pipe bracket portion.

It is an other object of the present invention to incorporate a pressure access plate between the pipe bracket portion and either the emergency portion or the service portion of a railway freight brake control valve. The use of the pressure access plate of this invention makes access to the pressure in the auxiliary reservoir, the retainer, the emergency reservoir and brake cylinder lines easier so as to more readily determine the pressure of fluids in those lines.

A pressure access plate for use in a freight brake control valve of a railway freight vehicle is thus provided. The control valve is of the type using a brake pipe, a brake cylinder, an emergency reservoir and an auxiliary reservoir. The control valve further is of the type having a pipe bracket portion with a service portion and an emergency portion mounted thereto. The pipe bracket portion, typically type AB, has a first side and an oppositely directed second side. The first side of the pipe bracket portion is provided with means for mounting the service portion to the pipe bracket portion first side. The second side of the pipe bracket has means for mounting the emergency portion to the pipe bracket portion second side. A rear of the pipe bracket portion has means for connecting to pipes which communicate with the brake pipe, the brake cylinder retaining valve, the brake cylinder, the emergency reservoir and the auxiliary reservoir. The pipe bracket portion, the service portion and the emergency portion each have passageways for providing fluid communication from the brake pipe, the brake cylinder, the emergency reservoir and the auxiliary reservoir, through the pipe bracket portion to the service portion and the emergency portion.

The pipe bracket portion and the emergency portion each have openings connected to their respective passageways on confronting sides thereof and these openings are sealingly aligned to provide fluid communication between the respective passageways. The pipe bracket portion and the service portion each have openings connected to their respective passageways on confronting sides thereof and these openings are aligned to provide fluid communication therebetween. In this way, fluid entering the pipe bracket portion from the brake pipe, the brake cylinder, the emergency reservoir and the auxiliary reservoir may travel into the service portion and the emergency portion.

The access plate is mounted between the pipe bracket portion and either the service portion or the emergency portion. Gaskets may be provided on each side of the access plate to better seal in the fluid pressures. A number of passageways, preferably four, are provided through the access plate. Each of the passageways terminate in a respective access port along an end of the access plate, preferably a front face of the access plate opposite to the end that is attached to the railway car. A number of openings extend through opposed sides of the access plate. Each of the access plate openings intersect and are connected to respective passageways of the access plate. Each opening further is positioned so that on one side of the access plate, the openings correspond to the openings of the pipe bracket portion when the access plate is mounted to the pipe bracket portion. Each opening is also positioned so that on the opposite side of the access plate, the openings correspond to the openings of whichever of the emergency portion and the service portion is mounted to the access plate.

Thus, one or more access ports are provided that are connected to respective, selected ones of the passageways communicating to the brake pipe, the brake cylinder retaining valve, the brake cylinder, the emergency reservoir and the auxiliary reservoir. Preferably, the access ports are provided on the front face of the access plate. The inclusion of the access ports on the front face of the access plate allows for fluid pressures within the pipe bracket portion to be tested without removal of the service or emergency portion from the pipe bracket portion.

In some embodiments, a housing is attached to the access plate to connect to the access ports. And such housing may have a valve means for preventing the escape of fluid pressure therefrom when the valve means is "closed". When the fluid pressure within any or all of the passageways is to be tested, an adaptor engages with the housing, "opening" the valve means and allowing the fluid under pressure to enter the adaptor. Connections provided on the adaptor may then lend to a pressure testing device so that the fluid pressure within the passageways may be analyzed. The adaptor may be provided with a cam system or other means for moving the extending members into and out of the access housing so as to move the valve means into and out of the "open" position.

It is preferred that when the fluid pressure within the passageways is not being tested, a removable outer cover is provided as a secondary seal over the access housing to compliment the primary seal of the valve means and to prevent the entry of dirt or foreign material. A primary seal plate may be affixed to the access plate and be placed directly over the access ports. In this way, the seal plate and not the valve means of the housing (which is detached) is the primary means of sealing the fluid pressures within the access plate. As an alternative, the valve means may be provided within the access plate. In such embodiments, the housing need not be utilized and the adaptor may couple directly to the access plate.

It is further preferred that at least four access ports are utilized, communicating with each of the brake pipe, the brake cylinder, the emergency reservoir and the auxiliary reservoir. When the access plate is provided between the pipe bracket portion and the emergency portion, a quick action chamber is additionally provided in the pipe bracket portion. And, it is preferred that a quick action chamber access port is also provided for communicating to the quick action chamber.

As an alternative, the access plate may be made with access plate passageways additional terminating a second set of access ports along the rear face of the access plate. Thus, no matter if the front or rear of the pipe bracket portion is mounted to the railway car, a set of access ports can be directly accessible. It is preferred that whichever set of access ports is directed towards the railway car be blocked or otherwise obstructed so that fluid pressure may not be lost through that set of access ports.

Other objects and advantages of the invention will become apparent from a description of certain present preferred embodiments thereof shown in the drawings.

DETAILED DESCRIPTION OF PREFERRED EMBODIMENTS

Figure 1:
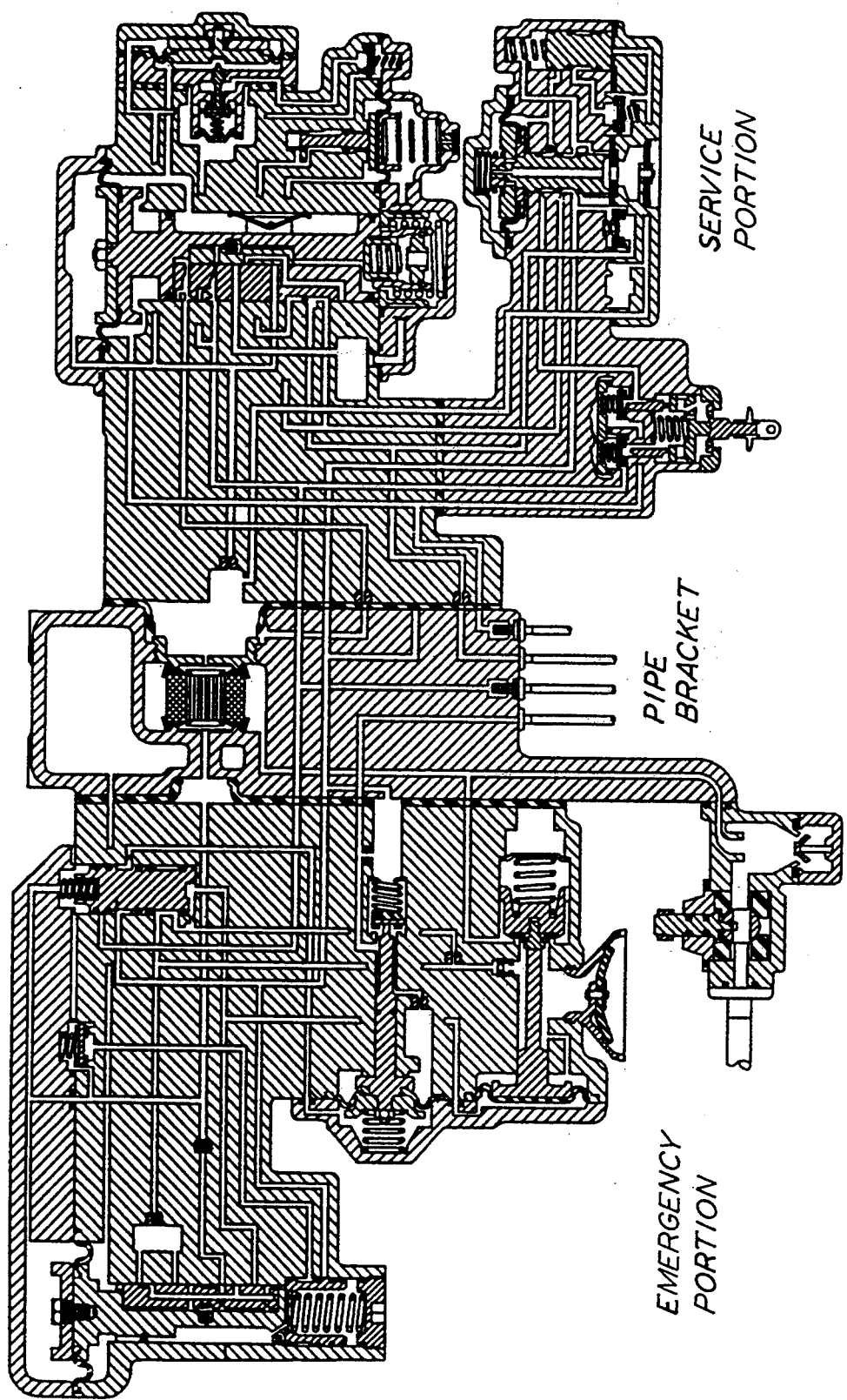
FIG. 1 is a schematic prior art of a railway freight brake control valve showing the pipe bracket portion, the emergency portion and the service portion and passageways running therethrough.

As can be seen in prior art FIG. 1, air brake practice incorporates pipe brackets in freight brake control valves which have an emergency portion and a service portion mounted thereto. As depicted in schematic FIG. 1, the service portion and emergency portion are mounted on opposite sides of the pipe bracket portion. As can further be seen in FIG. 1, various fluid passageways connect the pipe bracket portion with the emergency portion and service portion, respectively. Thus, it is currently the practice in the air brake industry to provide the pipe bracket portion with a number of passageways therethrough which open at the sides of the pipe bracket.

Figure 2:
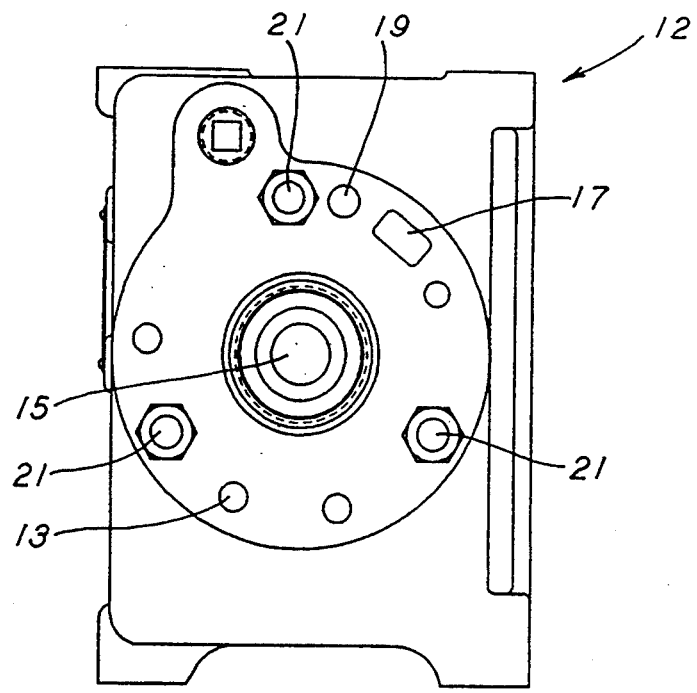
FIG. 2 is a front view of a prior art pipe bracket portion showing the side mounted to the service portion.

As shown in prior art FIG. 2, an opening 13 which connects to the brake cylinder passageway of the pipe bracket portion, such as a type AB, is provided on a first side of the pipe bracket portion. As seen in FIG. 2, an opening 15 which connects to the pipe bracket portion brake pipe passageway is also provided on the first side of the pipe bracket portion. An opening 17 which connects to the auxiliary reservoir passageway of the pipe bracket portion is also provided on the first side of the pipe bracket portion. And, an opening 19 which connects to the emergency reservoir passageway of the pipe bracket portion is also provided on the first side of the pipe bracket portion. Openings are also provided along the pipe bracket portion first side so that studs 21 may be anchored thereto.

Figure 3:
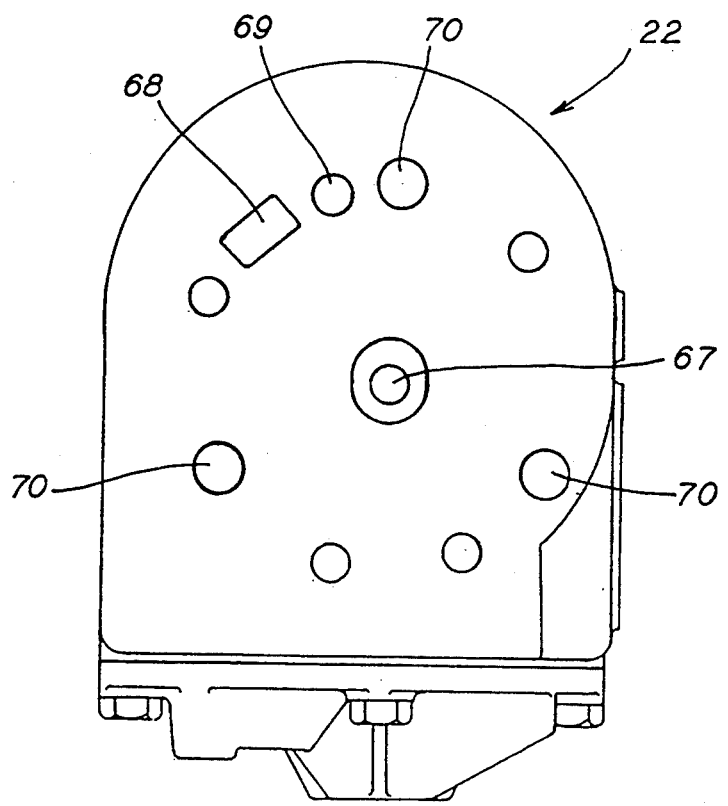
FIG. 3 is a front view of a prior art service portion showing the side mounted to the pipe bracket portion.

It is further the industry practice to provide such passageways through the service portion and emergency portion, such passageways opening to a side of the emergency portion and service portion. Thus, as shown in FIG. 3, an opening 66 which connects to the brake cylinder passageway of the service portion is provided along a side of the service portion. Similarly, an opening 67 which connects to the brake pipe passageway of the service portion is also provided on a side of the service portion. Also, an opening 68 which connects to the auxiliary reservoir passageway of the service portion is provided along a side of the service portion. Further, an opening 69 which connects to the emergency reservoir passageway of the service portion is provided along a side of the service portion. Openings 70 for studs are also provided along the side of the service portion so that the service portion may be anchored to the pipe bracket portion.

Figure 4:
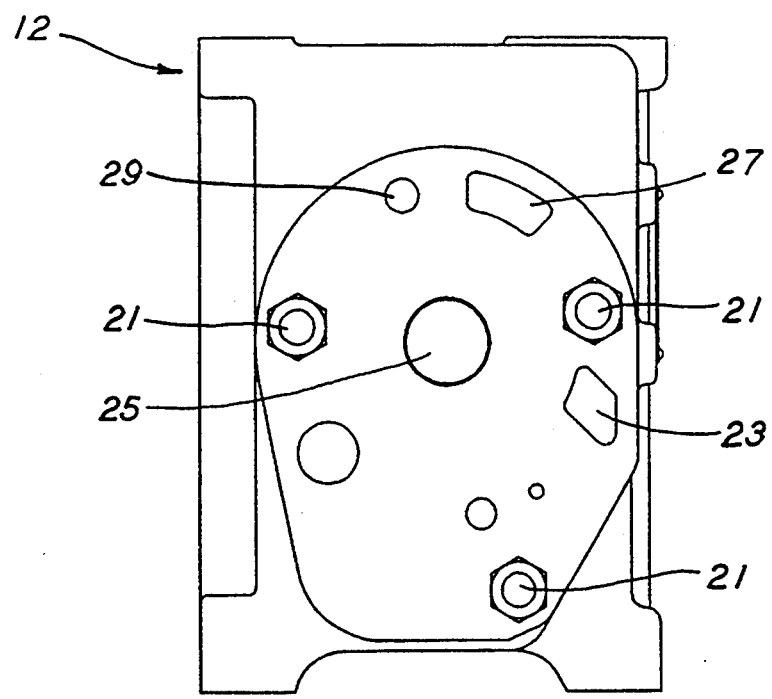
FIG. 4 is a front view of a prior art pipe bracket portion showing the side mounted to the emergency portion.

The emergency portion is similarly provided with such openings to connect the passageways of the emergency portion to the passageways off the pipe bracket portion. Thus, as can be seen in prior art FIG. 4, an opening 23 which connects to the brake cylinder passageway of the pipe bracket portion is provided on a second side of the pipe bracket portion. An opening 25 which connects to the brake pipe passageway is also provided on the second side of the pipe bracket portion. An opening 27 which connects to the quick action chamber passageway of the pipe bracket portion is provided on the second side of the pipe bracket portion. And, an opening 29 which connects to the emergency reservoir passageway of the pipe bracket portion is also provided on the second side of the pipe bracket portion. Openings are also provided along the pipe bracket portion second side so that studs 21 may be anchored thereto.

Figure 5:
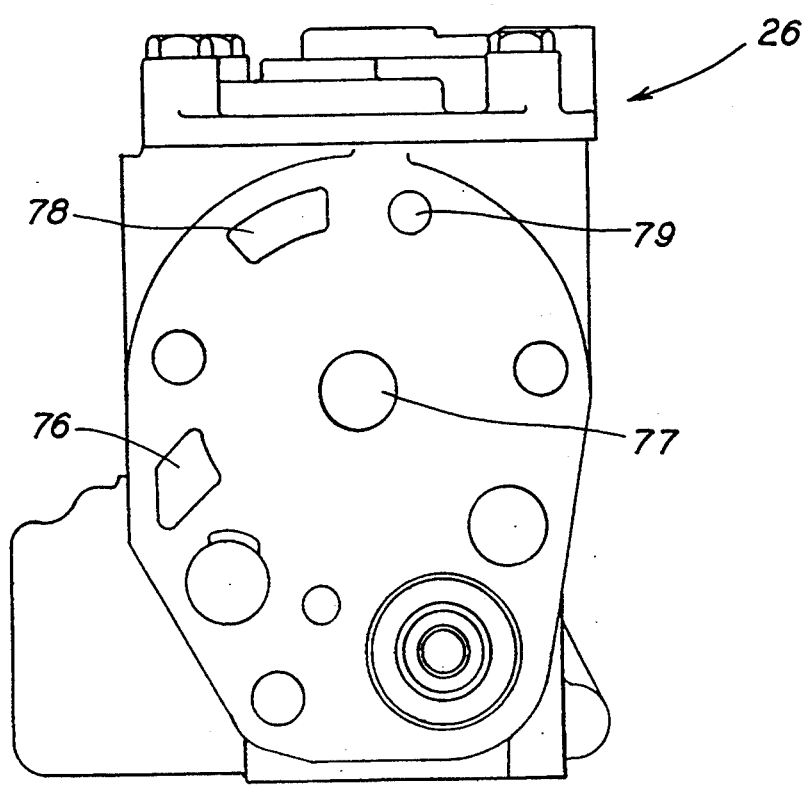
FIG. 5 is a front view of a prior art emergency portion showing the side mounted to the pipe bracket portion.

As can be seen in FIG. 5, an opening 76 which connects to the brake cylinder passageway of the emergency portion is provided along the side of the emergency portion. Similarly, an opening 77 which connects to the brake pipe passageway of the emergency portion is also provided on a side of the emergency portion. Further, an opening 78 which connects to the quick action chamber passageway of the emergency portion is provided along a side of the emergency portion. And, an opening 79 which connects to the emergency reservoir passageway of the emergency portion is provided along the side of the emergency portion. Openings 70 for studs are also provided along the sides of the emergency portion so that the emergency portion may be anchored to the pipe bracket portion.

The service portion and emergency portion are then mounted to the pipe bracket portion such that the openings on the side of the service portion and emergency portion match the openings on the opposed sides of the pipe bracket portion thus connecting the passageways of the service portion, the emergency portion and the pipe bracket portion. Typically, gaskets may be provided between the pipe bracket portion and the emergency portion and between the pipe bracket portion and the service portion to prevent fluid pressure loss at the connection.

Figure 6:
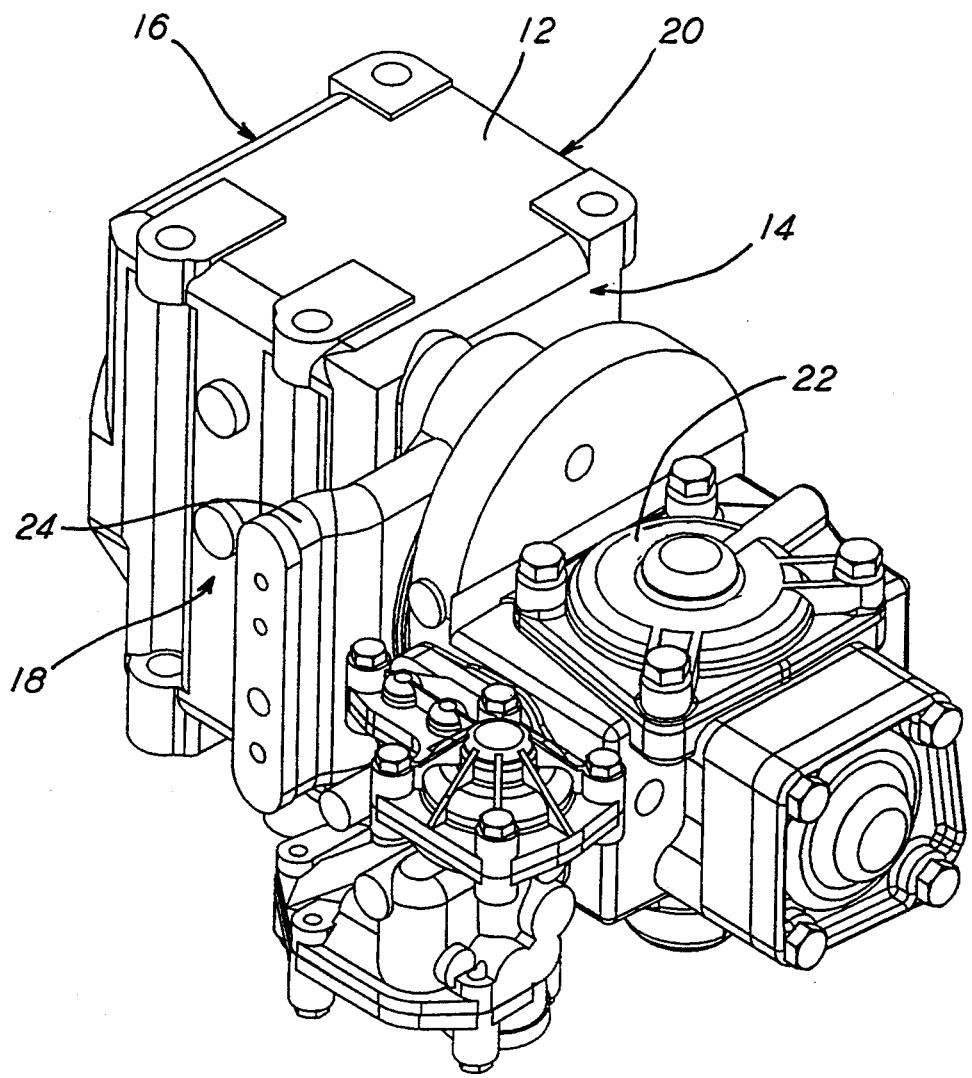
FIG. 6 is a perspective view of a service portion connected to the pipe bracket portion with the access plate mounted therebetween.

FIG. 6 shows a pipe bracket portion 12 having a first side 14 and an oppositely directed second side 16. The pipe bracket portion 12 further has a front 18 and an oppositely directed rear 20. As shown in FIG. 6, a service portion 22 is mounted to the first side 14 of the pipe bracket portion 12. The emergency portion is detached from the pipe bracket portion. However, service portion 22 is not mounted directly to pipe bracket portion first side 14 but rather an access plate 24 of the present invention is provided between the pipe bracket portion 12 and the service portion 22. Although access plate 24 is shown mounted between the service portion 22 and pipe bracket portion 12, an access plate similar to 24 may instead be mounted between emergency portion 26 (not shown in FIG. 6) and pipe bracket portion 12. In such similar access plate, the internal passageways will correspond to the respective ports on the pipe bracket and the emergency portion.

A brake pipe connection (not shown) connects a brake pipe to the pipe bracket portion rear 20. A brake cylinder line, a brake cylinder retaining valve and an emergency reservoir line and an auxiliary reservoir line (each not shown) are also connected to the rear 20 of the pipe bracket portion 12, by any suitable means, such as by flanged fittings.

Figure 7:
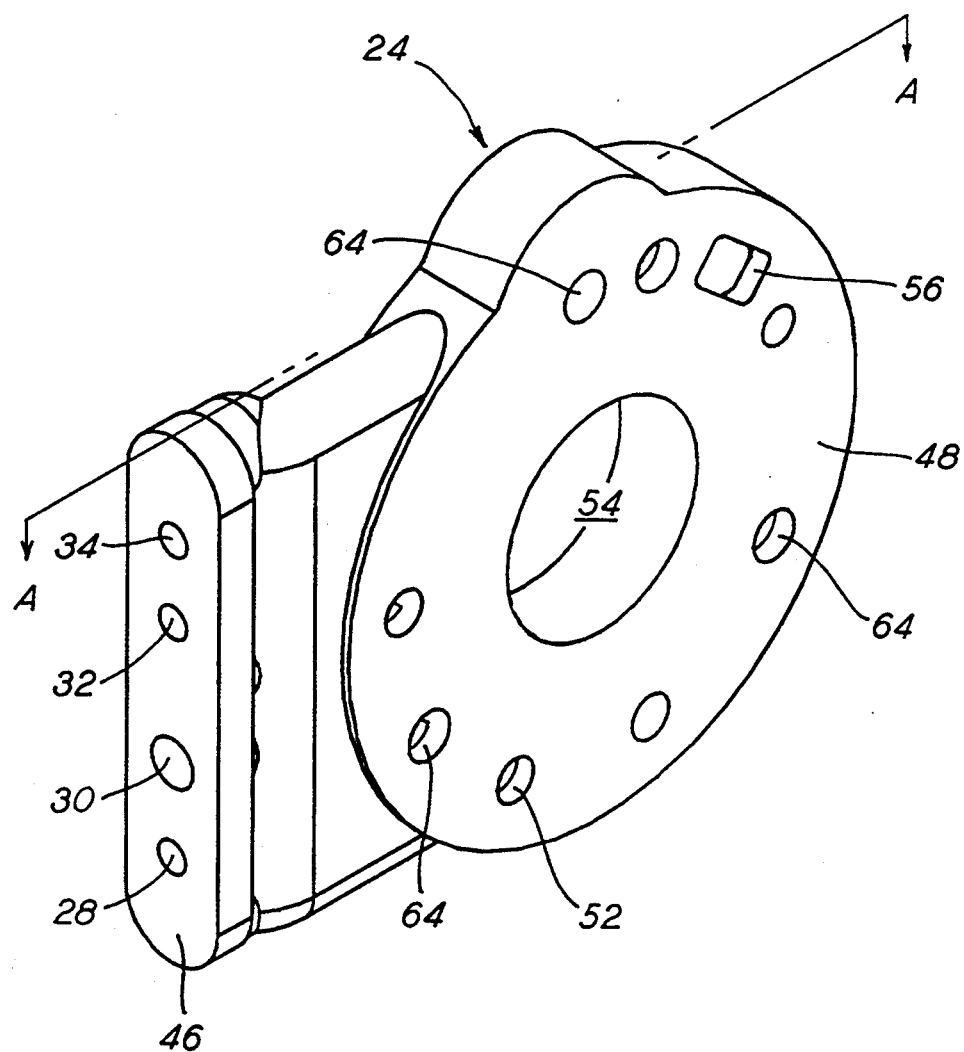
FIG. 7 is a perspective view of the preferred access plate showing the side of the access plate mounted to the service portion.
Figure 8:
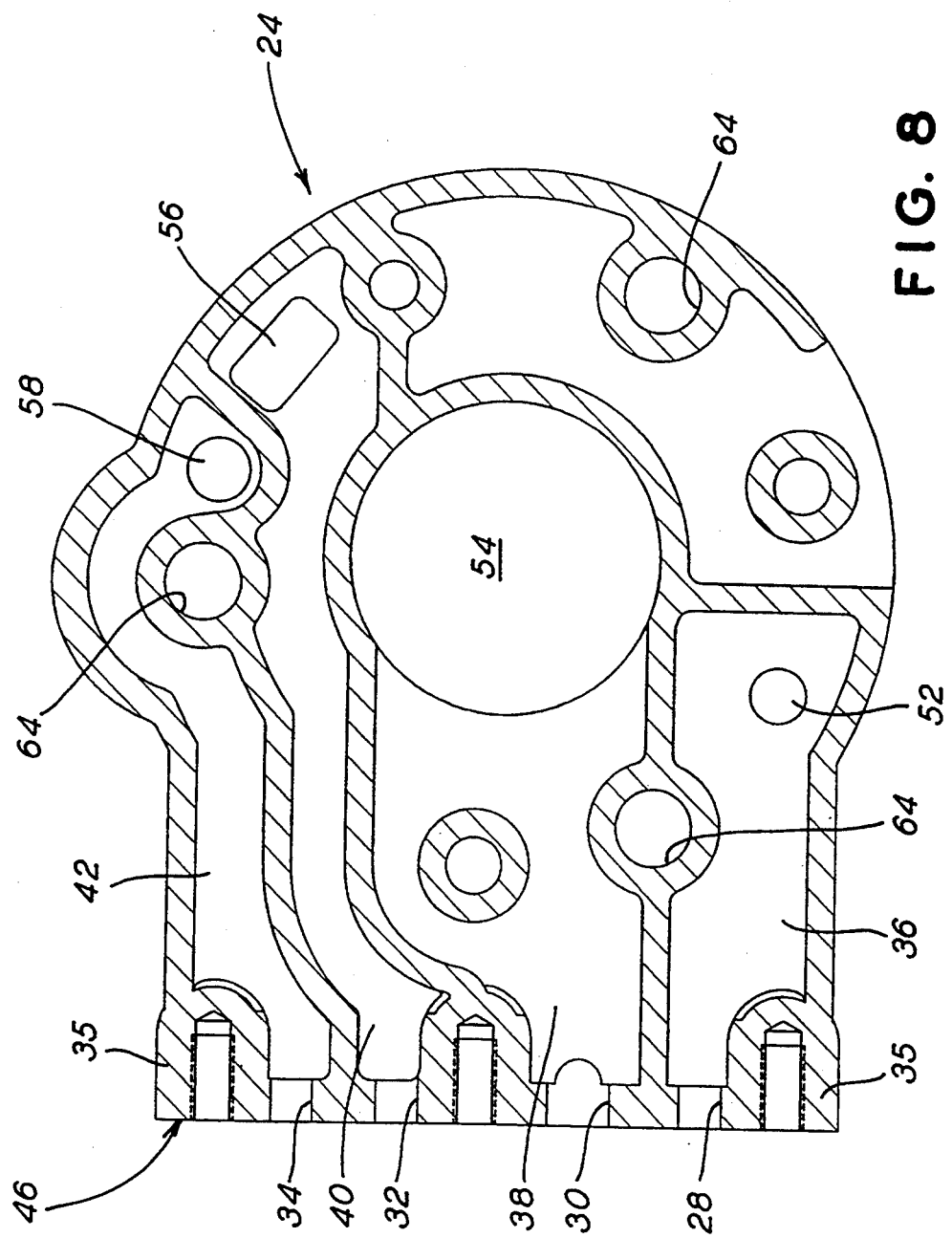
FIG. 8 is a cross sectional view of the preferred access plate taken along line A—A of FIG. 7.
Figure 9:
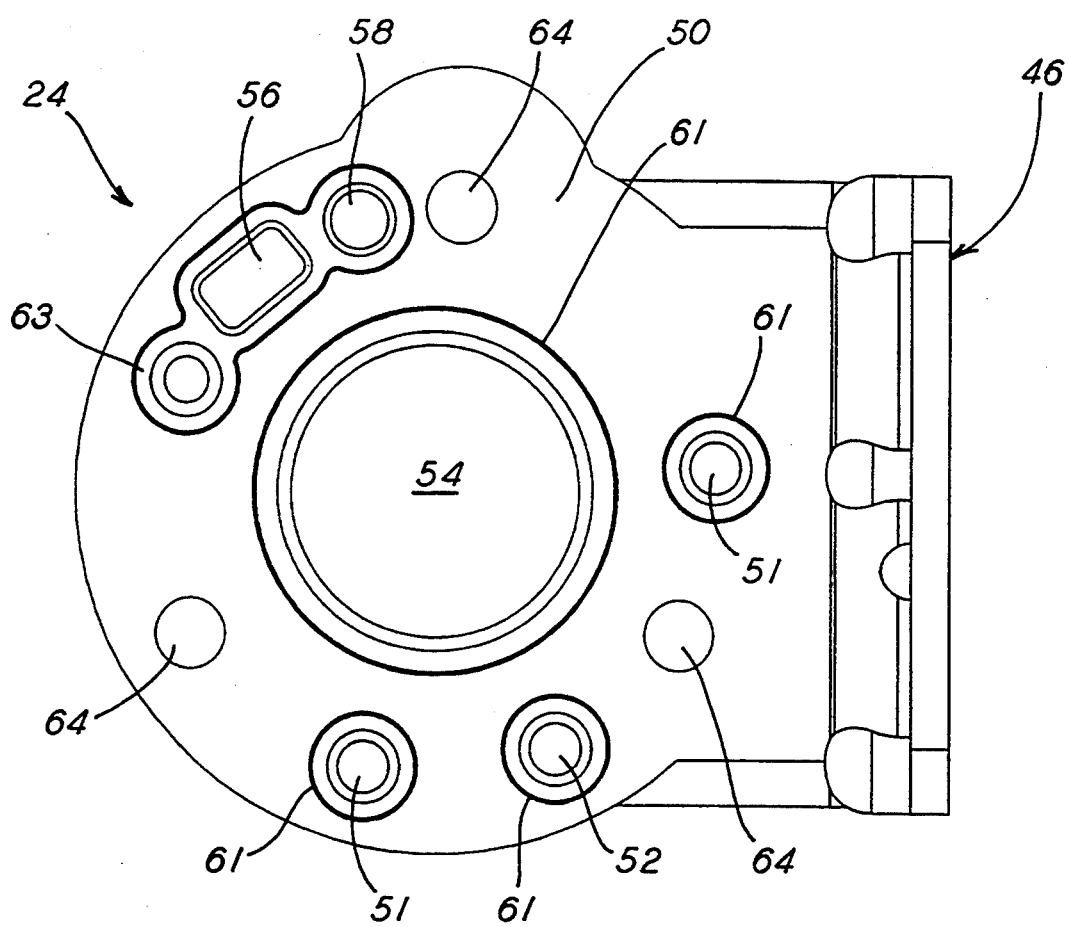
FIG. 9 is a side view of the preferred access plate showing the side of the access plate mounted to the pipe bracket portion.

Referring next to FIGS. 7, 8 and 9, the first preferred access plate 24 is shown. A number of passageways, preferably four, are provided through the access plate 24, each of the passageways terminating in a respective access port along the access plate front face 46. A brake cylinder port 28 is provided which connects to the brake cylinder passageway 36. A brake pipe port 30 is provided which connects to brake pipe passageway 38. Similarly, auxiliary reservoir port 32 is provided which connects to auxiliary reservoir passageway 40. Likewise, an emergency reservoir port 34 is provided which connects to emergency reservoir passageway 42. Each of the ports, 28, 30, 32, 34 open on the same flat planar surface of the access plate and are preferably arranged linearly. In addition, openings 35 are provided on the access plate front face 46 that can accommodate studs or screws as will be discussed more fully below with reference to FIG. 11.

As can be seen in FIGS. 7, 8, 9 and 10, the access plate preferably has a first side 48 and an oppositely directed second side 50. Several openings are provided through the access plate so as to extend through the access plate first side 48 through to the access plate second side 50. Openings 52, 54, 56, 58 are provided through the access plate, each of such openings intersecting and thus connecting to each respective access plate passageway 36, 38, 40, 42. Thus, a brake cylinder opening 52 is provided through the access plate 24 which intersects the brake cylinder passageway 36. Also, a brake pipe opening 54 is provided through the access plate 24 which intersects with the brake pipe passageway 38. Similarly, an auxiliary reservoir opening 56 is provided through the access plate 24 which intersects the auxiliary reservoir passageway 40. Furthermore, an emergency reservoir opening 58 is provided through the access plate 24 intersecting the emergency reservoir passageway 42. Therefore, the only access to any passageway is through its respective opening, on the first and second side 48, 50 of the access plate 24 and through its respective access port 28, 30, 32, 34. Preferably, annular gaskets 61 are provided around the circular access plate openings. However, a unitary gasket 63 may be provided around several adjacent openings.

Figure 10A:
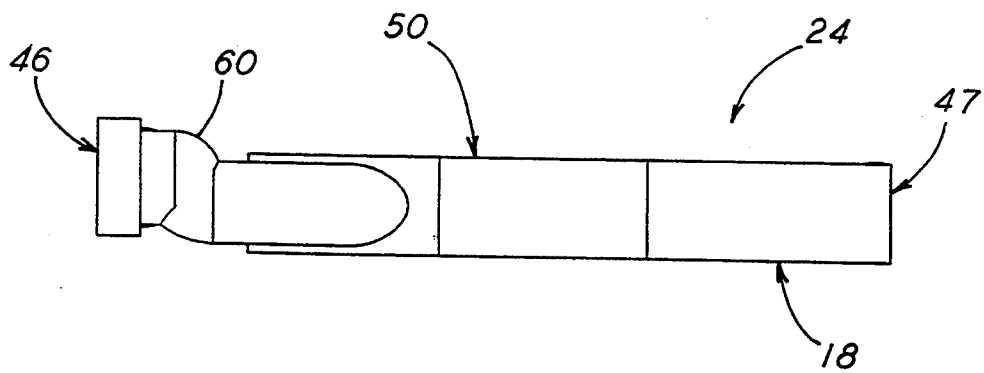
FIG. 10a is a top plan view of the preferred access plate.

Preferably, as can be seen in FIG. 10a, the access plate front face 46 is connected to the first and second sides 48, 50 of the access plate 24 by an angled portion 60 of the access plate 24. This angled portion 60 allows the front face 46 of the access plate 24 to be positioned a selected amount away from the service portion 22 when the access plate 24 is mounted between the service portion 22 and the pipe bracket portion 12.

Figure 10B:
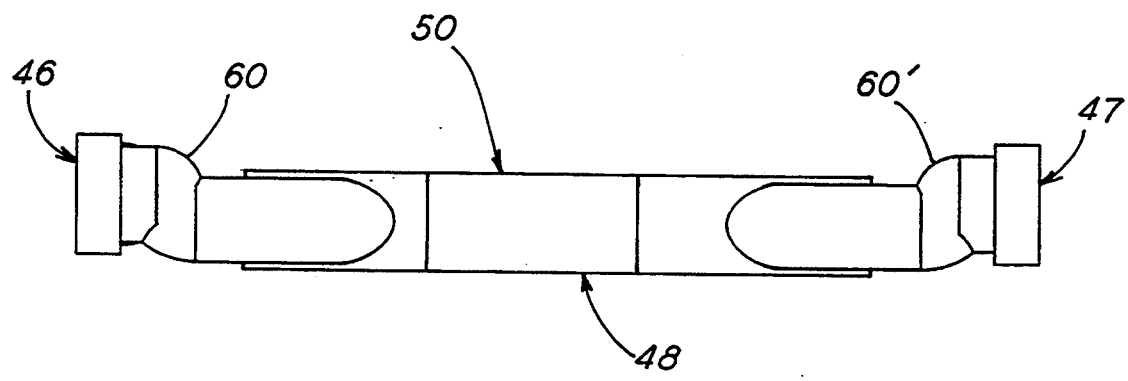
FIG. 10b is a top plan view of an alternative access plate having two sets of access ports.

As can be seen in FIG. 10b, the access plate passageways may additionally terminate in a second set of openings along the rear face 47 of the access plate. The rear face 47 of the access plate may also be connected to the first and second sides 48, 50 of the plate 24 by a second angled portion 60'. Thus, no matter if the pipe bracket portion is mounted to a railway car at its front 18 or at its rear 20, a set of access ports is directed away from the railway car and may be accessed. Preferably, whichever set of access ports faces the railway car would be plugged or otherwise blocked so that fluid pressure would not be lost through that set of access ports.

Referring again to FIGS. 7, 8 and 9, the service portion 22 and the access plate 24 are secured to the pipe bracket portion 12 by any convenient means such as by studs 62. Therefore, stud openings 64 are provided through the access plate 24. Preferably, stud openings 64 are surrounded by access plate material so that fluid pressure within an access plate passageway that the stud opening 64 intersects will not be lost through the stud opening 64. It is also preferred that certain fluid pressures in passageways that run between the pipe bracket portion and either the emergency portion or the service portion not be accessed by the access plate. Therefore, various pass through openings 51 extend through the access plate first side 48 through to the access plate second side 50. The pass through openings 51 are surrounded by access plate material 59 that fluid pressure will not be lost through the pass through openings 51 when the pass through openings 51 intersect an access plate passageway.

The openings 52, 54, 56, 58 through the sides of the access plate correspond to the openings 13, 15, 17, 19 of the pipe bracket portion and to the openings 66, 67, 68, 69 of the service portion. Thus, a brake cylinder passageway runs through the pipe bracket portion out of opening 13 along the side of the pipe bracket portion through opening 52 of the access plate into opening 66 of the service portion. Thus, the fluid pressure within the brake cylinder line is measurable at access port 28. Similarly, the brake pipe fluid pressure runs from the pipe bracket portion through opening 15 of the pipe bracket portion through opening 54 of the access plate into the brake pipe passageway 38, through opening 67 into the service portion. Thus, the fluid pressure in the brake pipe line may be measured at access port 30. Also, fluid in the auxiliary reservoir line of the pipe bracket portion may travel out of opening 17 of the pipe bracket portion through opening 56 of the access plate into the auxiliary reservoir passageway 40 of the access plate, through opening 68 of the service portion into the service portion. Thus, the fluid pressure of the auxiliary reservoir line may be measurable at access port 32. Similarly, fluid in the emergency reservoir line may travel from the pipe bracket portion through opening 19 of the pipe bracket portion through opening 58 of the access plate into emergency reservoir passageway 42 of the access plate, through opening 69 of the service portion into the service portion. Thus, the fluid pressure within the emergency reservoir line is measurable at access port 34.

Figure 11:
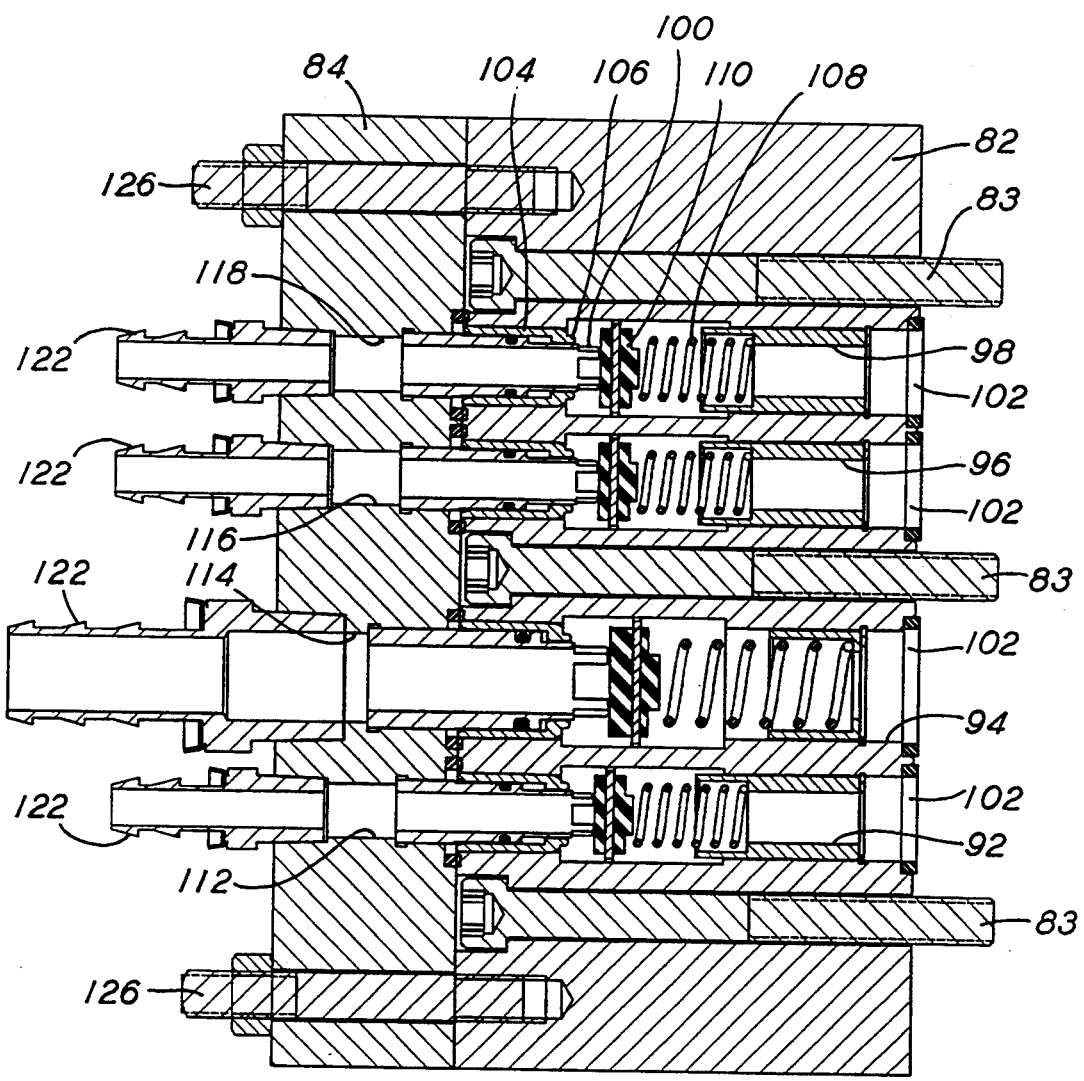
FIG. 11 is a side view taken in cross section of the access housing and adaptor.

Referring next to FIG. 11, an access housing 82 and adaptor 84 are shown which may be attached to the access plate. The access housing 82 is mounted upon the access plate at access plate front face 46. The access housing 82 may be affixed to the access plate 24 by any convenient means such as by housing screws 86 engaging openings 35 of the access plate 24 (see FIG. 8). Preferably, the access housing 82 has a planar surface which mates with the planar surface of access plate front face 46. It is further preferred that a gasket (not shown) be provided between the access housing 82 and the access plate front face 46.

The access housing 82 has channels 92, 94, 96, 98 for communicating with the respective access plate passageways 36, 38, 40, 42. The housing channels 92, 94, 96, 98 have opposed ends, with one end of each channel 92, 94, 96, 98 being bordered by an access end 102. Each access end 102 of the access channels 92, 94, 96, 98 being sized and configured to connect to an sealably engage with the respective access ports 28, 30, 32, 34. The end of each of the housing channels opposite to each access end 102 have a receiving chamber 104. Furthermore, the housing channels 92, 94, 96, 98 are positioned in the access housing 82 such that when the access housing 82 is placed in contact with access plate front face 46, the access ends 102 of each of the housing channels 92, 94, 96, 98 correspond in location to the respective access ports 28, 30, 32, 34 of the access plate 24.

Intermediate the receiving chamber 104 and the access end 102 of each housing channel 92, 94, 96, 98, preferably at a shouldered end of the receiving chamber 104, is a valve seat 106. Access housing 82 preferably has a valve means provided therein. Preferably, a number of valve means are provided within the access housing 82, such that a respective valve means is provided within each of the housing channels 92, 94, 96, 98. Each such valve means is preferably comprised of a spring 108 seated within the housing channel and a stopper 110 engageable with the spring 108, which together operate in cooperation with the valve seat 106. The stoppers 110 are each movable within their respective housing channel 92, 94, 96, 98 and are biased by the springs 108 into contact with the valve seats 106. With stoppers 110 in bias contact with the respective valve seats 106, the valve means is said to be in the closed position, in which fluid from the access ports 28, 30, 32, 34 cannot pass through valve seats 106 into the receiving chambers 104 of each housing channel 92, 94, 96, 98. Thus, when the valve means is in the closed position, no fluid pressure is lost through the access housing 82. The housing may be secured to the access plate by any convenient means, such as by studs.

As can be seen in FIG. 11, an adaptor 84 may be attached to access housing 82 when it is desired to access the fluid pressures of the various access plate passageways 36, 38, 40, 42, which represent respectively the fluid pressures in the brake cylinder, the brake pipe, the auxiliary reservoir and the emergency reservoir. The adaptor 84 is connected to the access housing 82 by any convenient means such as by studs 126. Adaptor 84 has channels 112, 114, 116, 118 provided therethrough. The adaptor channels are each bounded at one end by a respective extending member 120, which extends outward from one end of the adaptor 84. At an opposite end of the adaptor channels 112, 114, 116, 118, the adaptor channels are each bounded by a respective fitting 122, which extends outward from the adaptor 84. Adaptor channels 112, 114, 116, 118 are positioned along adaptor 84 such that when the adaptor 84 is placed adjacent the access housing 82, each adaptor channel 112, 114, 116, 118 corresponds in position and location with each respective housing channel 92, 94, 96, 98. Each of the adaptor extending members 120 are sized and configured to fit inside and sealably engage with each respective receiving chamber 104 of the access housing channels 92, 94, 96, 98.

When each adaptor extending member 120 is inserted within its respective receiving chamber 104 of the access housing channels 92, 94, 96, 98, each extending member 120 contacts a respective valve means stopper 110. As the extending members 120 are inserted fully within each receiving chamber 104, the extending members 120 push each valve means stopper 110 overcoming the spring bias against stopper 110 and moving the stopper 110 back away from its respective valve seat 106 into an "open" position. The extending members 120 are sized and configured so that when they are inserted within the receiving chambers 104, fluid may travel around the extending members 120 and into the respective housing channels 92, 94, 96, 98. When the valve means stopper 110 is in the open position, fluid pressure may travel from the access plate passageways 36, 38, 40, 42, through the respective access ports 28, 30, 32, 34, through the respective housing channels 92, 94, 96, 98 and the respective adaptor channels 112, 114, 116, 118 and out of the adaptor fittings 122 where the fluid pressure may be an analyzed.

When the adaptor 84 is separated from the access housing 82 such that each extending member 120 of the adaptor 84 is removed from its corresponding receiving chamber 104 of the access housing 82, the springs 108 will force the stoppers 110 against their respective valve seats 106, causing the valve means to return to the closed position. Thus, when the adaptor 84 is removed from engagement with the access housing 82, fluid pressure is maintained within the access housing 82.

Figure 12:
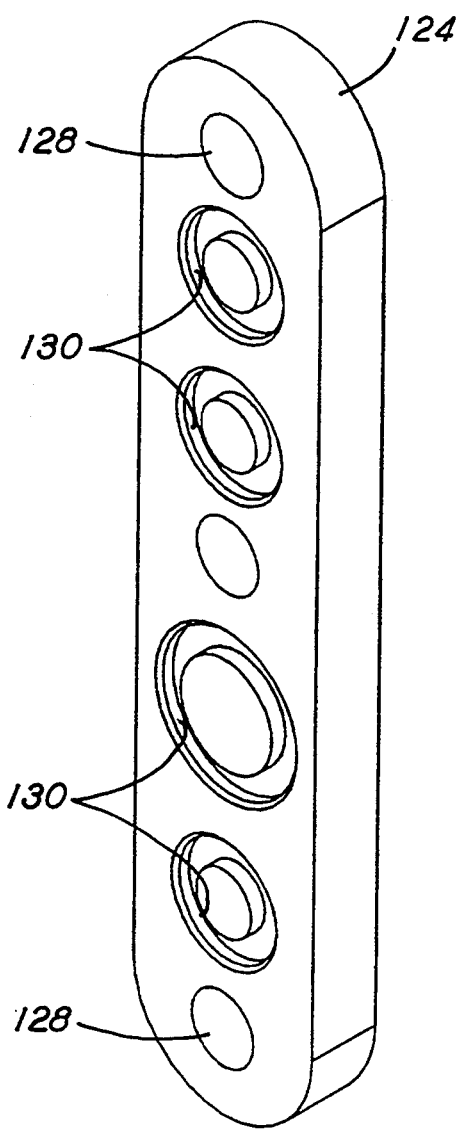
FIG. 12 is a perspective view of the outer cover seal.

To provide primary sealing of the fluid pressure within pipe bracket portion 12 and to prevent the pipe bracket 12 from being contaminated by foreign material through the access ports 28, 30, 32, 34, a removable outer cover seal 124, shown in FIG. 12, may be provided for engagement with the access plate 24. Once the housing 82 has been detached from the access plate 24, the cover 124 may be secured to the access plate 24 by any convenient means, such as by studs (not shown) which extend through stud holes 128 of the cover 124. Preferably, indentations 130 are provided upon the cover 124. The indentations 130 are sized, configured and positioned to correspond and engage each of access ports 28, 30, 32, 34. In addition, gaskets may be provided around indentations 130 to further seal the access ports 28, 30, 32, 34.

Figure 14:
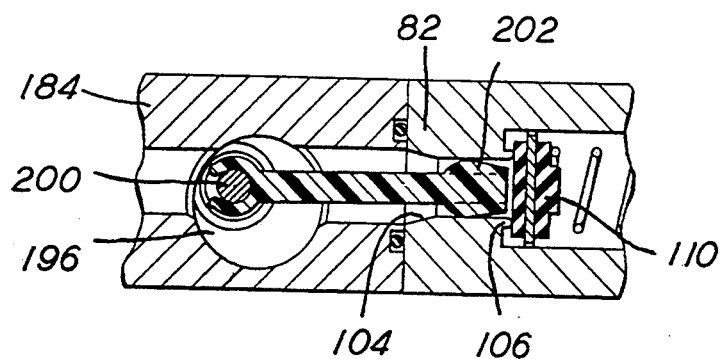
FIG. 14 is a cross sectional view taken along line B—B of FIG. 13.
Figure 13:
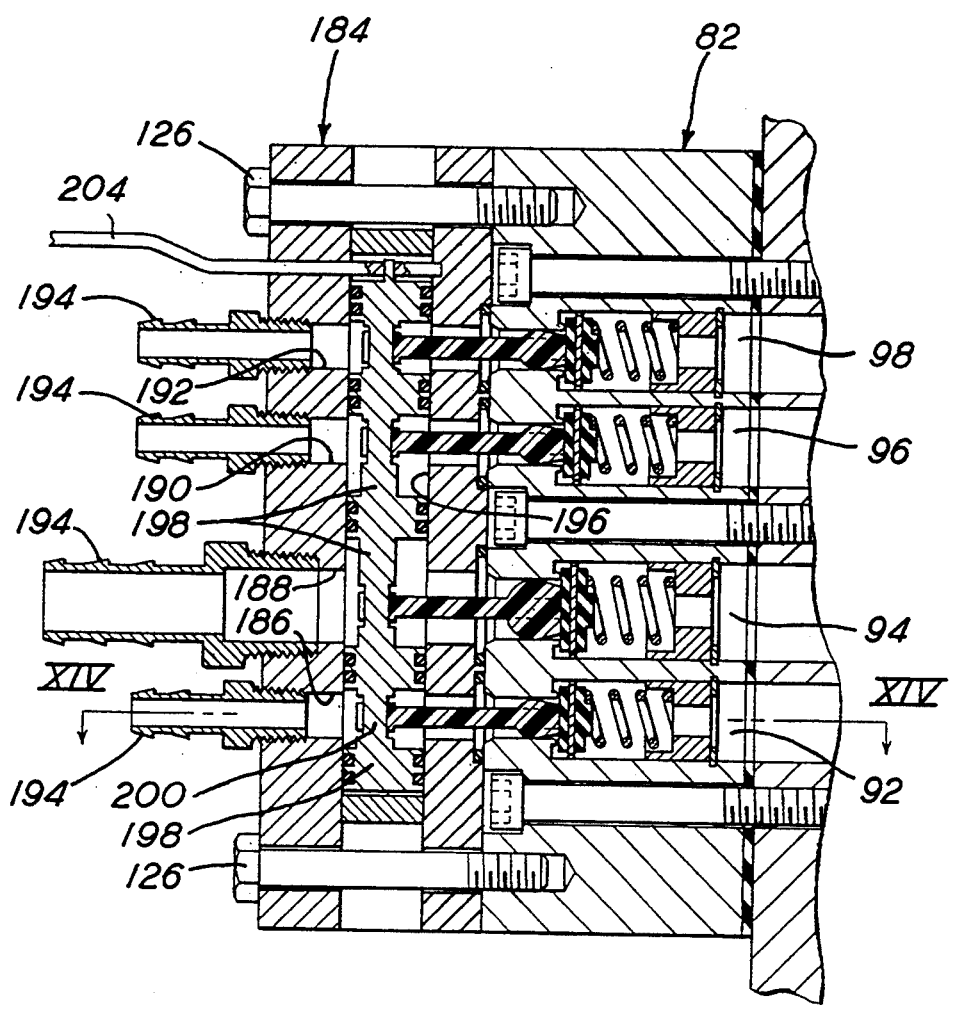
FIG. 13 is a side view taken in cross section of the access housing and a second preferred adaptor.

Referring next to FIGS. 13 and 14, a modified adaptor 184 may be attached to access housing 82 as a means of accessing the fluid pressures of the various access plate passageways 36, 38, 40, 42. With respect to the following description of adaptor 184, the access housing 82 operates in identical fashion as was described with respect to FIG. 11.

The adaptor 184 is affixed to the access housing 82 by any convenient means such as by studs 126. Adaptor 184 has channels 186, 188, 190, 192 provided therethrough. The adaptor channels 186, 188, 190, 192 are each bounded at one end by a respective fitting 194, which extends outward from the adaptor 184. An opposite end of each adaptor channel 186, 188, 190, 192 is connected to a transverse cam shaft bore 196. Provided within the cam shaft bore 196 is a cam shaft 198 having a number of eccentric portions 200. Each eccentric portion 200 is coupled to a respective extending member 202. The respective extending members 202 extend outward from an end of the respective adaptor channel opposite to the end bounded by the fitting 194.

The adaptor channels 186, 188, 190, 192 are positioned along adaptor 184 such that when the adaptor 184 is placed adjacent the access housing 82, each adaptor channel 186, 188, 190, 192 corresponds in position and location with each respective housing channel 92, 94, 96, 98. Each of the adaptor extending members 202 are sized and configured to fit inside and sealably engage with each respective receiving chamber 104 of the access housing channels 92, 94, 96, 98. When adaptor 184 is so positioned adjacent the access housing 82 and is affixed thereto such as by studs 126, the extending members 202 of adaptor 184 extend within receiving chambers 104 but do not contact valve means stopper 110 or, in the alternative, do not sufficiently contact valve means stopper 110 to move valve means stopper 110 overcoming the spring bias provided by spring 108 (not shown in FIGS. 13 and 14).

Once the adaptor 184 is secured to access housing 82 so that there is a seal between each respective adaptor channel 186, 188, 190, 192 and its respective access housing channel 92, 94, 96, 98, the cam shaft 198 is engaged. A cam handle 204 is provided which is connected to cam shaft 198. Thus, when handle 204 is rotated, cam shaft 198 is rotated as well within cam shaft bore 196. As cam shaft 198 is rotated, cam shaft eccentric portions 200 are moved in a circular path. As the handle 204 is rotated forward, the cam shaft eccentric portions 200 are rotated towards the access housing 82 causing extending members 202 to be moved further into the access housing 82. When the handle 204 is moved sufficiently, the extending members 202 are inserted fully within each receiving chamber 104, and the extending members 202 push each valve means stopper 110, overcoming the spring bias against stopper 110 and moving the stopper 110 back away from its respective valve seat 106 into an "open" position. The handle 204 is then locked into an open position while testing of the fluid pressures is conducted.

Once it is desired to disconnect the adaptor 184 from the access housing 82, the handle 204 is moved away from the access housing 82 moving the extending members 202 away from and out of each respective receiving chamber 104 so that the valve means stopper 110 is once again biased by the springs against their respective valve seats 106 causing the valve means to return to its "closed" position.

Figure 15:
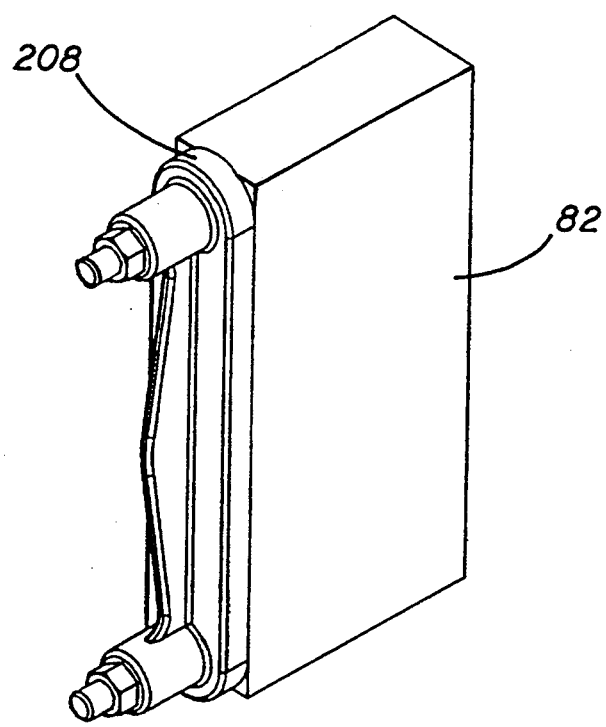
FIG. 15 is a perspective view of a secondary seal cover attached to the housing.

Referred next to FIG. 15, a secondary seal cover 208 may be sealable attached to the access housing 82 when the adaptor 84 is removed. The cover 208 acts as a secondary seal to compliment the primary seal provided by the valve means of the access housing 82. Seal cover 208 is designed to sealingly engage the access housing to prevent fluid pressure from exiting the access housing channels. Cover 208 is attached to the housing 82 by any convenient means, such as by screws or studs.

Figure 16:
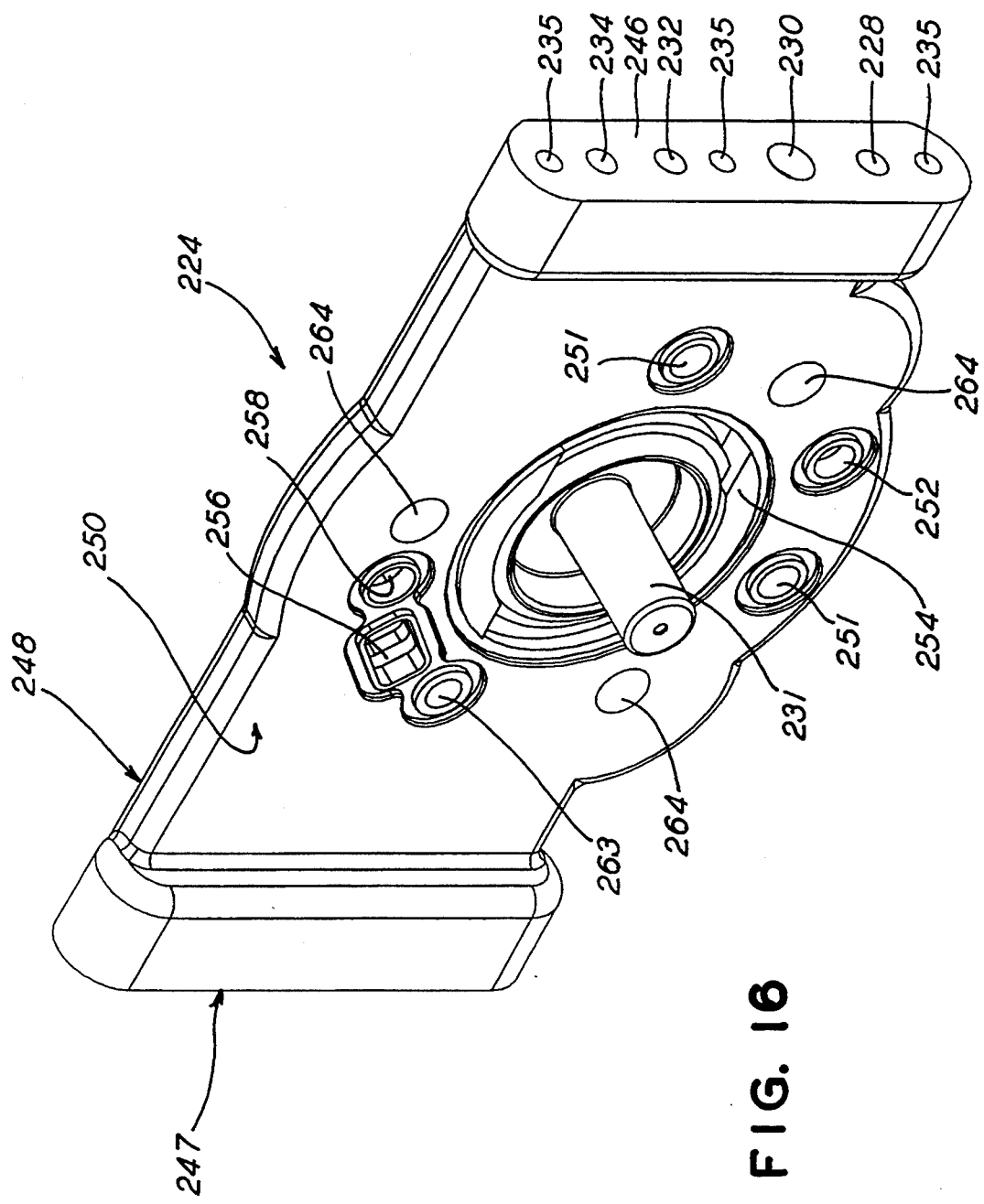
FIG. 16 is a perspective view of an alternative access plate having an cup portion.
Figure 17:
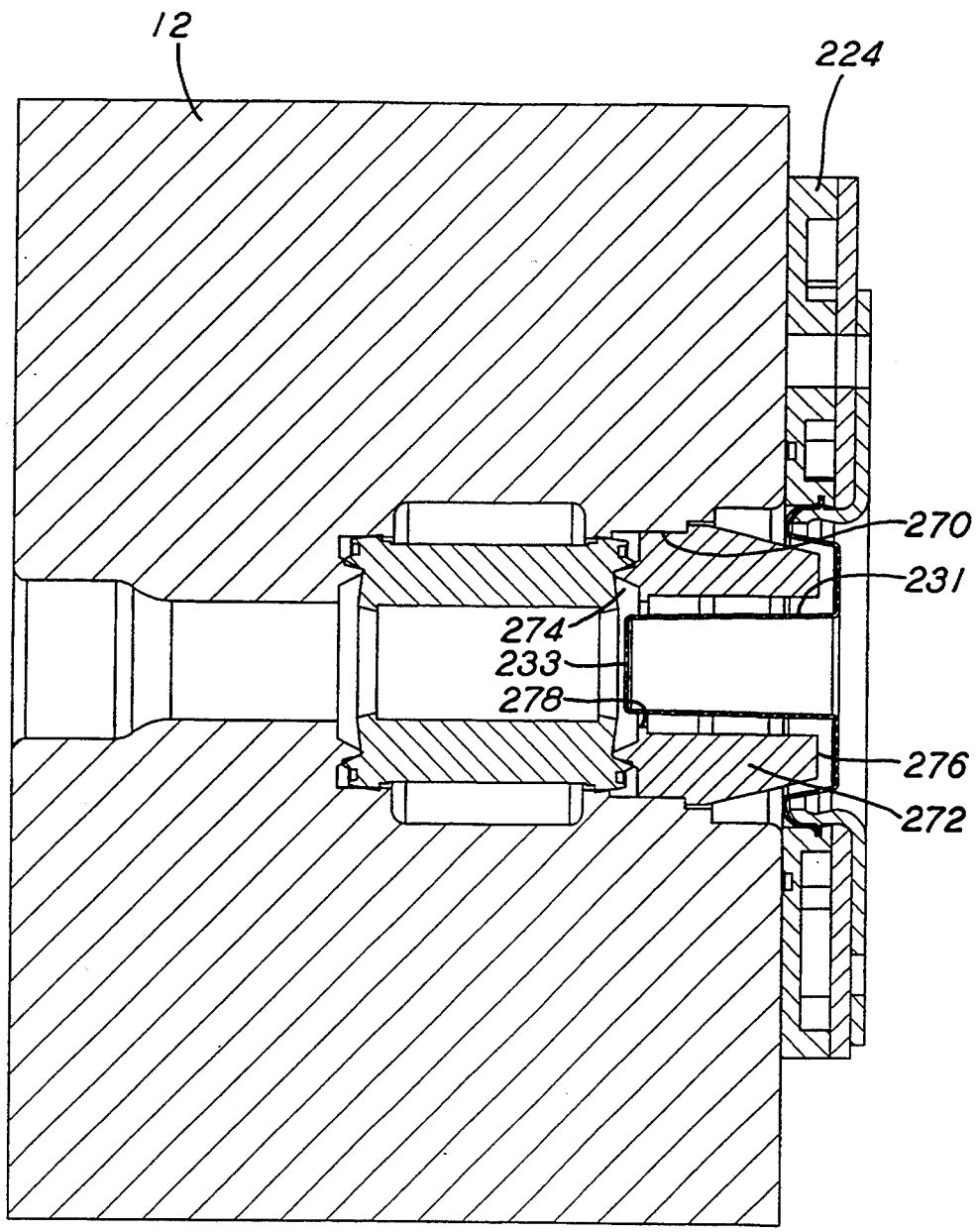
FIG. 17 is a fragmented, elevational view in cross section of a portion of the pipe bracket portion and access plate.
Figure 18:
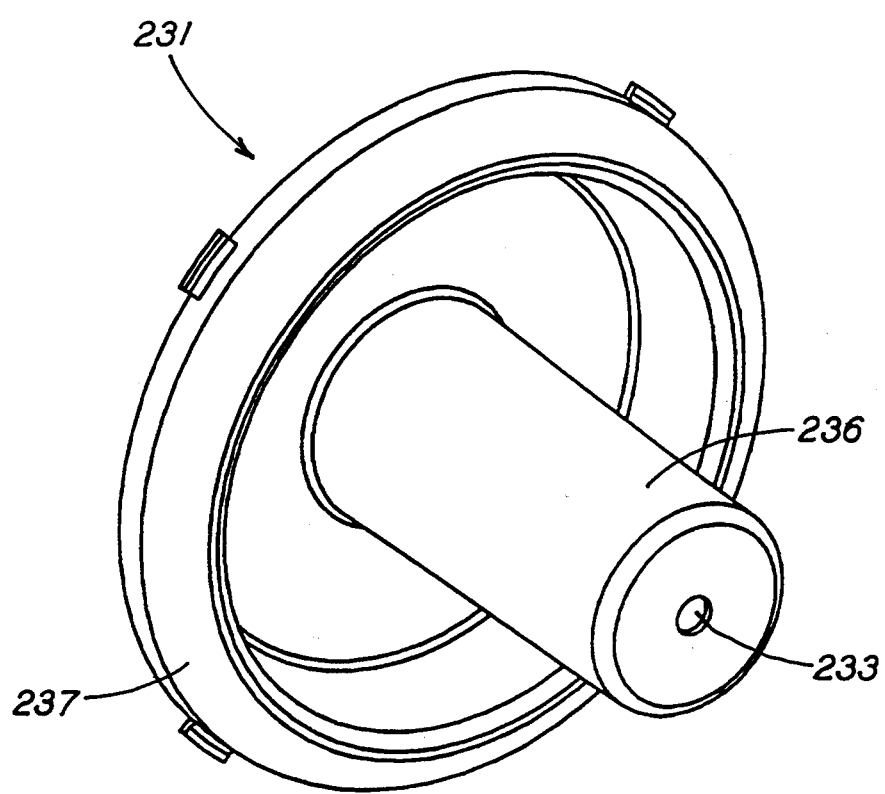
FIG. 18 is a perspective view of the cup portion of the access plate shown in FIG. 16.

Referring next to FIGS. 16, 17 and 18, an alternative access plate 224 is shown having a cup portion 231. In operation and in basic structure, the access plate 224 functions substantially similarly to the access plate 24 shown and described above. Access plate 224 has a number of passageways (not shown in FIG. 16), preferably four, each of the passageways terminating in a respective access port along the access plate front face 246. A brake cylinder port 228 is provided which connects to the brake cylinder passageway. A brake pipe port 230 is provided which connects to brake pipe passageway. Similarly, auxiliary reservoir port 232 is provided which connects to auxiliary reservoir passageway. Likewise, an emergency reservoir port 234 is provided which connects to emergency reservoir passageway. Each of the ports 228, 230, 232, 234 open on the same flat planar surface of the access plate and are preferably arranged linearly. In addition, it is preferred that openings 235 are provided on the access plate front face 246 that can accommodate studs or screws so that an access housing may be mounted thereto.

As can be seen in FIG. 16, the access plate 224 preferably has a first side 248 and an oppositely directed second side 250. Several openings are provided through the access plate so as to extend through the access plate first side 248 through to the access plate second side 250. Openings 252, 254, 256, 258 are provided through the access plate, each of such openings intersecting and thus connecting to each respective access plate passageway (not shown in FIG. 16). Thus, a brake cylinder opening 252 is provided through the access plate 224 which connects through its brake cylinder passageway to brake cylinder port 228. Also, a brake pipe opening 254 is provided through the access plate 224 which connects through its brake pipe passageway to brake pipe port 230. Similarly, an auxiliary reservoir opening 256 is provided through the access plate 224 which connects through its auxiliary reservoir passageway to auxiliary reservoir port 232. Furthermore, an emergency reservoir opening 258 is provided through the access plate 224 which connects through its emergency reservoir passageway to emergency reservoir port 234. Therefore, each passageway is isolated from the other passageways and to the surrounding air except through respective openings on the first and second side of the access plate and through the respective access ports 228, 230, 232, 234. Thus, access plate 224 is substantially identical to the embodiment shown in FIGS. 7, 8 and 9 except that alternative access plate 224 utilizes cup portion 231. It is preferred that access plate 224 have two sets of access ports, a set provided along the front face 246 and a set of access ports (not shown) provided along the rear face 247 of the access plate 224, as described with respect to the previously described embodiment of the access plate shown in FIG. 10b.

As shown in FIG. 17, the typical pipe bracket portion 12 has a cavity 270 connected to the brake pipe opening 15 (see also FIG. 2). A strainer nut 272 is provided within the brake pipe cavity 270. Strainers and strainer nuts of the general type utilized in connection with the present invention are described and shown in greater detail in copending application Ser. No. 08/291,220, which is incorporated herein by reference. The strainer nut 272 has a generally circular base portion 274 and a number (preferably four) of legs 276 extending outward therefrom and being spaced apart from one another. The base portion has an opening 278 provided therethrough. The access plate 224 is installed between the pipe bracket portion 12 and the service portion (not shown). Therefore, if the strainer nut opening 278 is too small, it may not be possible to generate a rate of brake pipe fluid pressure drop from the brake pipe access port 230 sufficient to cause the vent valve of the brake pipe (not shown) to go to the emergency condition. In order to generate a rate of brake pipe fluid pressure drop sufficient to cause the vent valve to go to emergency, it is preferred to increase the diameter of the strainer nut opening 278. However, in order to ensure proper operation of the service portion, the access plate passageway providing brake pipe pressure to the service portion should have a smaller diameter (around 0.156 inches). Thus, it is preferred to provide a larger diameter pathway (approximately 1.125 inches) between the brake pipe and the access plate 224 as well as a smaller diameter pathway between the brake pipe and the service portion.

As can be seen in FIG. 18, a cup shaped portion 231 is attached to access plate 224. Portion 231 preferably has a generally cylindrical portion 236 which extends from a generally annular base portion 237. A cup portion opening 233 is preferably provided through the end of the cylindrical portion 236 distal to the base portion 237. The cylindrical portion 236 of cup portion 231 extends at least partially into brake cylinder opening 252 and pipe bracket cavity 270. It is understood that cup portion 231 may be manufactured as a separate part from the remaining portions of the access plate, or may instead be manufactured with the access plate as a unitary article. Furthermore, although the cup portion 231 is shown as being cup-shaped, it is understood that any suitable shape of portion 231 may be utilized.

Therefore, referring to FIG. 17, the alternative embodiment of the access plate 224 involves a cup portion 231 that engages with the access plate 224 and is inserted into pipe bracket cavity 270 and between the strainer nut legs 276. In this way, brake pipe fluid pressure may travel to the service portion through the relatively small diameter of the cup portion opening 233. Or, brake pipe fluid pressure may be directed instead to the access plate 224 through the relatively large diameter filter nut opening 278, travelling around the cup portion 231. The cup portion 231 has a relatively smaller diameter hole 233 (preferably around 1.125 inch) as compared to the filter nut opening 278 (preferably around 0.156 inch) to supply brake pipe pressure to the service portion.

It is distinctly understood that although the present preferred embodiments of the access plate have been described in terms of being connected between the pipe bracket portion 12 and the service portion 22, the access plate may be readily adapted within the spirit of this invention to be provided between pipe bracket portion 12 and emergency portion 26. The openings in the access plate would simply be positioned to conform with the openings on the side of the pipe bracket portion which faces the emergency portion. Furthermore, the access plate openings would also correspond to the openings on the side of the emergency portion which is mounted to the pipe bracket portion.

Variations of the shown embodiments are also possible. For example, the four access ports 28, 30, 32, 34 are preferably connected to the brake cylinder passageway 36, the brake pipe passageway 38, the auxiliary reservoir passageway 40 and the emergency reservoir passageway 42, respectively. However, a quick action chamber (not shown) is also provided in the pipe bracket portion 12 and an additional access port can be provided within housing 82 for communicating to the quick action chamber. Furthermore, the access plate of the present invention is preferably an iron casting. However, the access plate may also be formed as a metal or plastic laminate.

While certain present preferred embodiments have been shown and described, it is distinctly understood that the invention is not limited thereto but may be otherwise embodied within the scope of the following claims.

We claim:

1. A pressure access plate for use with a freight brake control valve of a railway freight vehicle, wherein such control valve is of the type in which a brake pipe, a brake cylinder, an emergency reservoir and an auxiliary reservoir are connected to a portion thereof; said control valve further is of the type having a pipe bracket portion with a service portion and an emergency portion mounted on opposite sides thereto, and wherein said pipe bracket portion, said service portion and said emergency portion each have respective fluid communication means for communicating fluid pressure between such brake pipe, such brake cylinder, such emergency reservoir and such auxiliary reservoir, respectively, through said pipe bracket portion to said service portion and said emergency portion, such pressure access plate comprising:

fluid communication means for communicating fluid pressure between said fluid communication means of said pipe bracket portion and said fluid communication means of one of said emergency portion and said service portion;

means for accessing fluid pressures in said access plate fluid communication means, such that fluid under pressure may flow from said pipe bracket portion through said access plate to one of said emergency portion and said service portion, and said fluid under pressure from said pipe bracket portion may flow through said access plate to said fluid pressure accessing means; and sealing means for sealing said access plate between said pipe bracket portion and one of said service portion and said emergency portion.

2. The access plate of claim 1 wherein said means for accessing fluid pressures in said access plate fluid communication means comprises a plurality of access ports provided along a face of said access plate, each such access port being in fluid communication with respective access plate fluid communication means.

3. The access plate of claim 2 wherein said access ports are mounted on a front face thereof.

4. The access plate of claim 2 wherein said access ports are mounted on a rear face thereof.

5. The access plate of claim 2 further comprising a housing having at least one channel extending therethrough, each such at least one housing channel being bounded at one end by a housing channel access end and each such at least one channel being bounded at an opposite end by a receiving chamber, wherein each said channel access end being sized and configured to sealably engage with a respective one of said access ports.

6. The access plate of claim 2, further comprising a removable outer cover sealable with said access ports.

7. The access plate of claim 5, wherein said housing further includes at least one valve means, movable to a closed position in which fluid pressures are contained within each said channel of said housing, and an open position in which fluid pressure may exit said housing channels.

8. The access plate of claim 7 further comprising an adaptor having a selected number of channels extending therethrough, each such adaptor channel being bounded at an end that sealably engages said access housing by a respective extending member and an opposite end of each such adaptor channel being connectable to fluid pressure analyzing means, wherein said extending members enter a respective access housing receiving chamber, moving said valve means to said open position.

9. The access plate of claim 7 further comprising an adaptor having at least one channel extending therethrough, each such adaptor channel having one end connectable to fluid pressure analyzing means and having an opposite end engageable with a respective access housing channel, said adaptor further having at least one extending member provided respectively at each at least one access channel, and said adaptor further having means for moving said at least one extending member sufficiently towards and away from a respective access housing receiving chamber to move said valve means into and out of said open position.

10. The access plate of claim 9 wherein said means for moving said at least one extending member comprises manually moving said at least one extending member generally linearly towards and away from said respective access housing receiving chamber and said access housing valve means.

11. The access plate of claim 2 wherein said at least one access port includes at least four ports communicating with each of such brake pipe, such brake cylinder, such emergency reservoir and such auxiliary reservoir.

12. The access plate of claim 9 further comprising a housing having four channels extending therethrough, each such housing channel being bounded at one end by a housing channel access and each such channel being bounded at an opposite end by a receiving chamber, wherein said channel access ends being sized and configured to sealably engage with respective ones of said access ports.

13. The access plate of claim 2 wherein said access plate is mounted between said pipe bracket portion and said service portion.

14. The access plate of claim 2 wherein said access plate is mounted between said pipe bracket portion and said emergency portion.

15. The access plate of claim 2 wherein said selected ones of said access plate passageways further terminate in a second access port on said face of said access plate opposite to said face having said first access ports.

16. The access plate of claim 15 wherein one of said selected first access ports and said selected second access ports are sealable to prevent the passage of fluid pressure therethrough.

17. The access plate of claim 2 wherein said fluid communication means of said brake pipe from said pipe bracket portion comprises a first fluid pressure pathway to said access ports and a second fluid pathway to said one of said service portion and said emergency portion, and wherein said second fluid pathway having means for restricting said fluid pressure to said one of said service portion and said emergency portion.

18. The access plate of claim 17 wherein said means for restricting fluid pressure to said second fluid pathway comprises a cup portion of said access plate having an opening therethrough.

19. The access plate of claim 18 wherein said cup portion is generally cup shaped.

20. The access plate of claim 18 wherein said cup portion is fabricated as part of said access plate.

21. The access plate of claim 18 wherein said cup portion is fabricated as a separate structural element from said access plate and is attached to said access plate.

* * * * *